United States Patent [19]

Chip et al.

[11] Patent Number: 4,985,469
[45] Date of Patent: Jan. 15, 1991

[54] POLYMERIC PARTICLES AND THEIR PREPARATION

[75] Inventors: Gerald K. Chip, Scarborough; Alfred Rudin, Waterloo, both of Canada

[73] Assignee: Tioxide Group, London, England

[21] Appl. No.: 280,969

[22] Filed: Dec. 7, 1988

[30] Foreign Application Priority Data

Dec. 17, 1987 [GB] United Kingdom ............... 8729399

[51] Int. Cl.$^5$ .................... C08J 9/28; C08F 265/04
[52] U.S. Cl. ......................... 521/64; 521/54; 521/57; 521/134; 521/59; 525/301; 525/902; 523/201
[58] Field of Search ............... 525/301, 902; 521/64, 521/57, 54, 59, 134; 523/201

[56] References Cited

U.S. PATENT DOCUMENTS

| | | |
|---|---|---|
| 4,107,120 | 8/1978 | Plamondom et al. . |
| 4,181,769 | 1/1980 | Plamondom et al. . |
| 4,226,752 | 10/1980 | Ericson et al. . |
| 4,325,856 | 4/1982 | Ishikawa et al. . |
| 4,419,496 | 12/1983 | Henton et al. . |
| 4,427,836 | 1/1984 | Kowalski et al. . |
| 4,468,498 | 8/1984 | Kowalski et al. . |
| 4,469,825 | 9/1984 | Kowalski et al. . |
| 4,497,917 | 2/1985 | Upson et al. . |
| 4,521,568 | 6/1985 | Mori et al. . |
| 4,543,383 | 9/1985 | Heil et al. . |
| 4,594,363 | 6/1986 | Blakenship et al. . |
| 4,677,003 | 6/1987 | Redlich et al. . |
| 4,717,750 | 1/1989 | Makati et al. . |

FOREIGN PATENT DOCUMENTS

| | | |
|---|---|---|
| 0031964 | 7/1981 | European Pat. Off. . |
| 0073529 | 3/1983 | European Pat. Off. . |
| 0188325 | 7/1986 | European Pat. Off. . |

*Primary Examiner*—Morton Foelak
*Attorney, Agent, or Firm*—Banner, Birch, McKie & Beckett

[57] ABSTRACT

Polymer particles or beads for use as opacifiers in paints are described in which a core is provided with a hard sheath and the particle has one or more voids produced by reaction with a nonvolatile permanent or fixed base. The sheath is a copolymer of an ethylenically unsaturated aliphatic monomer free of acid groups and at least 2 percent by weight of a soft ester-containing monomer and optionally styrene in an amount of up to 25 mole percent. The core is formed from an ethylenically unsaturated monomer with acid functionality.

The sheath polymer has a glass transition temperature of at least 40° C. The particles have a size of up to 40000 nanometers before swelling the core by some 150 to 2000 percent.

14 Claims, No Drawings

POLYMERIC PARTICLES AND THEIR PREPARATION

This invention relates to polymeric particles and particularly to vesiculated particles or to particles containing voids.

According to the present invention a core/sheath polymer particle comprises a core of a polymer formed from at least one ethylenically unsaturated monomer containing acid functionality and a hard sheath substantially encapsulating said core, said sheath comprising a copolymer of a nonionic monoethylenically unsaturated aliphatic monomer, at least 2 weight percent of an ester-containing unsaturated monomer selected such that the homopolymer of said ester-containing unsaturated monomer has a glass transition temperature not higher than 15° C. and from 0 to 25 mole per cent of a nonionic monoethylenically unsaturated aromatic monomer and the glass transition temperature of the copolymer, forming said sheath being at least 40° C. and being free of functional acid groups and said particles containing at least one void resulting from the reaction with a nonvolatile fixed or permanent base.

According to the invention also a process for the preparation of core/sheath polymer particles comprises establishing a monomer system of at least one ethylenically unsaturated monomer with acid functionality, polymerizing said system in the form of an aqueous emulsion to form core particles, establishing an aqueous dispersion of said core particles and a mixture of a nonionic monoethylenically substituted aliphatic monomer, said nonionic monomer being free of functional acid groups and containing at least 2 weight percent of an ester-containing unsaturated monomer selected from those monomers which on homo-polymerization produce a polymer having a glass transition temperature not higher than 15° C. and from 0 to 25 mole per cent of a nonionic monoethylenically unsaturated aromatic monomer and effecting co-polymerization of the monomers to deposit on said core particles a hard sheath free of acid groups and having a glass transition temperature of at least 40° C. and mixing said core/sheath particles so formed with a nonvolatile fixed or permanent base in the absence of organic solvent to swell said cores at an elevated temperature to generate therein one or more voids.

The present invention provides vesiculated polymer particles, or core/sheath particles with one or more voids in said core, which have a hard protective sheath free of functional acid groups and which have been prepared by a process employing nonvolatile fixed or permanent bases as swelling agents and said swelling being carried out in a system free of organic solvent. Recovery of organic solvents is avoided as is the recovery of excess volatile base such as ammonia.

The production of core/sheath particles is accomplished by sequential emulsion polymerization in aqueous media. In the preferred embodiment of this invention particles of a preformed latex or "seed" polymer dispersed in water are increased in size by polymerization of one or more successive polymers onto the preformed particles. Care must be taken in the subsequent polymerization stages to ensure that the later stage polymers are deposited on the preformed particles and do not form new particles or are not embedded within the polymer particles that have been made in previous stages. The procedures described in this invention are effective in preventing the formation of "new generation" particles wherein the second or later polymerization stages result in product which is not deposited on the pre-existing particles. Measurement of the particle size distributions of the dispersed polymer at every stage of the sequential polymerisation process ensures that the desired encapsulation of earlier stage particles by polymer made in later stages has indeed occurred.

Particle size distribution is conveniently and reliably measured by use of a disk centrifuge such as that described by J. D. Hildreth and D. Patterson in J. Soc. Dyers Color., 80, 474 (1960).

The core polymer may be made by aqueous emulsion copolymerization of one or more ethylenically unsaturated monomers containing a carbon-carbon double bond and a carboxylic acid group. It is preferred, but not essential, that the carbon-carbon double bond in such monomers contains a carbon atom that carries two hydrogens. Such monomers are generally more reactive in polymerizations than the corresponding acidic monomers in which both carbons of the double bond are bonded to substituents other than hydrogen. Suitable acidic monomers include acrylic acid, methacrylic acid, itaconic acid, aconitic acid, maleic acid or anhydride, fumaric acid, crotonic acid, monoesters of the dibasic acids mentioned above and the like. Methacrylic acid is the preferred acidic component in this invention. The core polymer may be produced by the polymerization of one or more such acidic monomers. In preferred embodiments, however, an acidic monomer or mixture thereof is copolymerized with one or more ethylenically unsaturated monomers that contain no ionizable groups. Examples of such ethylenically unsaturated monomers include methyl methacrylate, styrene, vinyl toluene, alpha-methylstyrene, ethylene, vinyl acetate, vinyl chloride, acrylonitrile, (meth)acrylamide, various alkyl or alkenyl esters of methacrylic or acrylic acid, various alkyl esters of vinyl alcohol and the like. In general core polymers containing at least 10 per cent and preferably at least 20%, by weight of acid-containing monomers are particularly useful in the present invention.

The monomer mixture used to produce the core polymer preferably includes a small amount of a difunctional or polyfunctional ethylenically unsaturated monomer, such as ethylene glycol diacrylate or dimethacrylate, allyl methacrylate or acrylate, 1,3-butanediol diacrylate or dimethacrylate, divinyl benzene, trimethylolpropane triacrylate and the like. The proportion of such di- or polyfunctional monomer may be in the range of 0.1% to about 5% by weight, based on the total monomer formed into the core. Similar monomers in small amounts may also be used to form the sheath.

The monomers that are used to form the sheath copolymer comprise a substantial fraction of one or more nonionic monoethylenically unsaturated aliphatic monomers having no acid or other ionisable groups. Examples of such aliphatic monomers are esters of methacrylic acid e.g. methyl methacrylate, vinyl chloride, vinylidene chloride and acrytonitrile. As indicated mixtures of two or more of these aliphatic monomers may be employed.

These aliphatic monomers may be considered to be "hard" monomers and the copolymer is also prepared from as an essential co-monomer at least 2 weight percent of an ester-containing unsaturated monomer or mixtures of such monomers. These monomers are of the type which may be classed "soft" monomers and those of use in the present invention would if polymerised to a homopolymer result in a polymer having a glass transition temperature not greater than 15° C. Typical examples of these soft monomers are the alkyl acrylates such as butyl acrylate, ethyl acrylate, isobutyl acrylate, various ethyl hexy acrylates, alkyl methacrylates, e.g. lauryl methacrylate, long chain esters of acrylic and methacrylic acids and esters of maleic acid. Dibutyl maleate may be used as the "soft" monomer if desired.

As indicated hereinbefore the sheath can contain from 0 to 25 mole percent of an aromatic monomer in which a phenyl or other aromatic group is attached to one of the carbon atoms of the carbon-carbon double bond. Examples are styrene, alphamethylstyrene, vinyl toluene, ring substituted derivatives of these monomers and mixtures thereof.

A useful measure of the softening temperature of the sheath polymer is its glass-to-rubber transition temperature, which is denoted here as Tg. Tg may be measured by a variety of methods that are well known in the industry. Such methods are summarized in textbooks of polymer science such as "Elements of Polymer Science and Engineering", by Alfred Rudin, published by Academic Press in 1982. The Tg of a copolymer may be approximated by the equation:

$$\frac{1}{Tg} = \frac{W_a}{Tg_a} + \frac{W_b}{Tg_b}$$

where $T_g$ is the glass-to-rubber transition temperature of the copolymer and $Tg_a$ and $Tg_b$ are the Tg values for homopolymers of monomer a and monomer b, which are present in the comonomer mixture with weight fractions of $W_a$ and $W_b$, respectively. The Tg of the sheath copolymer should be at least 40° C. and may be up to 120° C., preferably from 60° C. to 100° C.

Tg in this specification was measured by differential scanning calorimetry, a technique which is widely practised and is described for example in the monograph entitled "Thermal Characterization of Polymeric Materials", edited by Edith A. Turi and published by Academic Press Inc. in 1981. The Tg that is measured is affected by the heating rate employed in the measurement. In the present instance, heating rates of 5°, 10° and 15° C. per minute were employed and the values reported were obtained by plotting Tg observed versus log heating rate and extrapolating to a heating rate of 1° C. per minute (log heating rate=zero), as described in an article by A. Rudin and D. Burgin in Polymer (London), volume 16, page 281, 1975.

In accordance with the present invention it is necessary that at least 2 weight percent of a soft monomer, which is preferably an ester of acrylic or maleic acid be incorporated in the sheath copolymer. Sheath copolymers incorporating small proportions of butyl acrylate, for example, can be swollen by hot aqueous base in contrast to other sheath polymers that lack such minor quantity of butyl acrylate and may have lower Tg's but are not swellable to produce voids.

In an optional, but preferred process for making the core/sheath polymers of this invention the first stage in the emulsion polymerization sequence is the production of a so-called seed latex, which provides nuclei for the subsequent growth of the core polymer. The polymer of the seed latex may contain an acidic vinyl monomer, but this is not essential for the purposes of this invention. The particle size of the seed latex is preferably less than 100 nanometres.

The acid-containing core polymer, whether produced in a single stage or a multiplicity of stages, usually has a particle size between 100 and 1000 nanometers and preferably between 100 and 500 nanometers. Such measurements refer to the sizes of the latex particles in the unswollen condition.

The overall size of the unswollen core/sheath polymer latex particles usually is 150 to about 4000 nanometers and preferably between 200 and 2000 nanometers.

After swelling of the core/sheath latex particles in warm water containing a permanent base the core volume has been swollen by some 150 to 2000 percent. The extent of core swelling can be determined using the disc centrifuge described hereinbefore.

A qualitative, but very convenient method to detect the absence or presence of swelling in the particles involves drying the latex at room temperature and then suspending the particles in a hydrocarbon oil ($n_D^{20}=1.515$). The suspension is examined with an optical microscope at about 1000 times magnification. The unswollen particles are uniform and appear as dark spheres while the swollen particles show bright cores in dark circles and are bigger than the precursor unswollen particles.

Transmission electron microscopy (TEM) can also be used to detect the presence of voids in a latex. Micrographs of the core-sheath polymer before and after swelling show very distinct patterns; the unswollen particles usually appear as dark spots due to the absorption of the electron beam by the polymer particles whereas the swollen particles, under identical conditions, have light spots in their centres because the electrons are not absorbed by the voids.

The polymerization reactions involved in the present invention are initiated with initiating agents that are generally similar to those employed in conventional emulsion polymerizations. As is common to such processes, preferably water-soluble initiators are used. Examples are tert-butyl hydroperoxide, hydrogen peroxide, an alkali metal (sodium, potassium or lithium) or ammonium persulphate or a mixture of such initiator with a reducing agent to form a redox system. Examples of reducing agents include alkali metal or ammonium metabisulphites, hydrosulphites or hyposulphites, or sodium formaldehyde sulphoxylate or various metal ions, such as iron, chromium, copper and the like, that may exist in plurality of valence states. The concentration of initiator may be from 0.01 to about 2 percent by weight of the monomers used in the polymerization and an approximately similar range of reducing agent may be used, in a redox system.

The molecular weight distribution of the polymer formed in any of the polymerization steps may be controlled through use of a free radical chain transfer agent, such as mercaptan, mercaptoethanol or carbon tetrachloride. Preferably, however, such transfer agents are not used.

Nonionic or anionic emulsifiers may be used, either alone or together. In the final latex, it is preferable that there should be present both an anionic surfactant and a nonionic surfactant, for best polymerization of the monomer(s). The choice of mixed surfactants, along with the proper selection of initiator and polymerization temperature, facilitates the production of a stable latex and substantially complete absence of residual monomers, the presence of which would make the latex product obnoxious. Suitable anionic surfactants include sodium dodecyl benzene sulphonate and the like. Suitable nonionic surfactants include ethoxylated alkyl phenols, where the alkyl group is nonyl, octyl, decyl, or similar substances that are known in the industry.

The swelling of the core/sheath particles is effected through the use of non-volatile fixed or permanent bases and at elevated temperatures. Typically the swelling is effected at a temperature of from 50° C. to 120° C. more preferably from 85° C. to 98° C. using an inorganic base such as an alkali metal hydroxide, bicarbonate or other similar base. Sodium hydroxide and potassium hydroxide are eminently suitable for use as the base. Sodium carbonate can be used but there is a tendency to rupture the sheath as a result of the release of carbon dioxide.

The swollen core/sheath particles contain voids which when the particles are in the form of an aqueous dispersion are filled with liquid water. On drying the voids should become filled with air or other gas thus conferring on the particles their opacifying properties.

The particles can be used in a wide variety of applications such as aqueous paint systems, plastic compositions and many others where opacity is an important consideration.

The invention is illustrated in the following examples.

EXAMPLE 1

The emulsions were prepared in a thermostatically controlled glass reactor, fitted with a stirrer, condenser and a glass tube for purging with nitrogen. A seed polymer was prepared according to the following formulation.

| | |
|---|---|
| water | 433 g |
| anionic surfactant (Siponate DS-10, Alcolac Inc.) | 0.3 g |
| ammonium persulphate initiator | 0.45 g |
| t-butyl hydroperoxide (70%) | 0.15 ml |
| sodium formaldehyde sulfoxylate | 0.15 g |
| pH is adjusted to 6.5 with a suitable water soluble base | |
| monomer emulsion: | |
| water | 39.7 g |
| anionic surfactant (Siponate DS-10) | 0.06 g |
| butyl acrylate | 62 g |
| methyl methacrylate | 56 g |
| methacrylic acid | 1.55 g |

In a one liter reactor, water, surfactant, initiator and 7.5 g of the monomer emulsion were combined with stirring under a nitrogen atmosphere at 78° C. After fifteen minutes the remaining monomer emulsion was added at a rate of 1 g/min. and the reaction temperature was raised to 85° C. Fifteen minutes after monomer addition was complete, the mixture was cooled. At 55° C. the t-butyl hydroperoxide and then the sodium formaldehyde sulfoxylate dissolved in 5 ml. of water were added. The seed polymer emulsion so obtained was filtered through a 100 mesh screen to remove coagulum. Number average particle size was determined to be 94 nm.

A core polymer was prepared according to the following formulation.

| | |
|---|---|
| water | 1060 g |
| ammonium persulphate initiator | 2.1 g |
| seed polymer emulsion (19.6% solids) | 31 g |
| monomer emulsion: | |
| water | 118 g |
| anionic surfactant (Siponate DS-10) | 0.4 g |
| methyl methacrylate | 245 g |
| methacrylic acid | 105 g |
| ethylene glycol dimethacrylate | 1.75 g |

In a two liter reactor, water, initiator and seed polymer were combined with stirring under a nitrogen atmosphere at 85° C. Monomer emulsion was added to the reactor at 2.6 g/min. and when the addition was complete, the reactor was held at 85° C. for 30 minutes. The core polymer emulsion so obtained was cooled to 25° C. and filtered through a 100 mesh screen. Number average particle size was determined to be 332 nm.

A core/sheath polymer was prepared according to the following formulation.

| | |
|---|---|
| water | 346.6 g |
| ammonium persulphate initiator | 0.72 |
| core polymer emulsion (23% solids) | 78.9 g |
| monomer emulsion: | |
| water | 119.9 g |
| styrene | 47 g |
| methyl methacrylate | 262 g |
| butyl acrylate | 6.3 g |
| anionic surfactant (Polystep A-15) | 3.9 g |
| nonionic surfactant (Alkasurf NP40) | 6.8 g | initiator solution: 0.13 g ammonium persulphate in 15 g $H_2O$
reducer solution: 0.07 g sodium formaldehyde sulfoxylate in 15 g $H_2O$ The composition of the sheath polymer is styrene 15, methyl methacrylate 83 and butyl acrylate 2.

In a one liter reactor, water, initiator and core polymer were combined with stirring at 85° C. Monomer emulsion was added at 2.0 g/min. Separate initiator and reducer solutions were added over the course of the monomer emulsion addition. One hour after monomer addition was complete, the emulsion of core/sheath polymer particles was cooled to 25° C. and filtered through a 100 mesh screen. Number average particle size was determined to be 450 nm.

Particle size measurements were performed on an ICI-Joyce Lobel Disk Centrifuge. Centrifuge speeds were chosen so that particles passed the detector between 1 and 25 minutes after injection. The output of the optical detector was recorded on a strip chart recorder operated at 2.5 V full scale. Samples were diluted to between 0.25 and 0.5% weight concentrations with a 80% water-20% methanol mixture. The spin fluid was water or a glycerol-water mixture. The density gradient within the spin fluid was formed with methanol for a spin fluid of water and with water for a spin fluid of glycerol-water. In all cases stable sedimentation conditions were achieved.

These particles were held for one hour at 95° C. in water with pH 11.75. This medium was made alkaline with sodium hydroxide. The final diameter of the swollen particles, after cooling, was found to be 550 nanometers, indicating a diameter swelling of 22 percent and a core volume swelling of 206 percent. The glass-to-rubber transition of the sheath copolymer of this latex is calculated to be 98° C., using the equations cited above and the following values for Tg's of homopolymers: 100° C. (polystyrene); 105° C. (polymethyl methacrylate) and −63° C. (polybutyl acrylate).

EXAMPLE 2

In another example, the core polymer was made as follows:

| | |
|---|---|
| water | 976.8 g |
| ammonium persulphate initiator | 2.9 g |
| seed polymer emulsion (19.6% solids) | 33.9 g |
| monomer emulsion: | |
| water | 159.1 g |
| anionic surfactant (Siponate DS-10) | 0.5 g |
| methyl methacrylate | 331.8 g |
| methacrylic acid | 142.1 g |
| ethylene glycol dimethacrylate | 2.4 g | initiator solution: 0.13 g ammonium persulphate in 15 g water
reducer solution: 0.07 g sodium formaldehyde sulphoxylate in 15 g water.

Polymerization was accomplished essentially as described for the core emulsion in Example 1. The copolymer composition in the core was methyl methacrylate 69.7, methacrylic acid 29.8 and ethylene glycol dimethacrylate 0.5, where all values are in parts by weight. The particle size was 160 nanometers.

A sheath was polymerized on this core, by using the following recipe:

| | |
|---|---|
| water | 345.6 g |
| core polymer emulsion (39% solids) | 78.9 g |
| ammonium persulphate | 0.72 g |
| monomer emulsion: | |
| water | 120 g |
| anionic surfactant (Polystep A-15) | 3.98 g |
| nonionic surfactant (Alkasurf NP40) | 6.76 g |
| styrene | 79.2 g |
| methyl methacrylate | 228.1 g |
| butyl acrylate | 9.5 g |

The monomer ratio, in the sheath is styrene 25, methyl methacrylate 72 and butyl acrylate 3. Polymerization was essentially described in the corresponding section of Example 1. The reaction here was at 88° C. and the monomer emulsion was added over the course of 3 hours. The product emulsion contained 36.6% solids. The Tg of the sheath polymer was measured to be 104° C.

An aliquot of this emulsion was heated with an equivalent amount of 20% aqueous sodium hydroxide at 96° C. After 1 hour a sample was taken for microscopic examination. Viewing in an oil dispersion, as described above, showed that voids were present in the polymer particles.

EXAMPLE 3

This example used the same core as that in Example 2. The sheath polymerization was also as in Example 2 except that the monomer ratios in the sheath polymer were styrene 25, methyl methacrylate 73 and butyl acrylate 2. The Tg of the sheath was found to be 106° C.

Neutralization with aqueous sodium hydroxide, as above, produced void-containing particles, a shown by optical microscopy.

EXAMPLE 4

In this example, the sheath polymer comprised 25 parts styrene and 75 parts methyl methacrylate with no soft monomer, as specified above. The Tg of the sheath was measured as 108° C. Treatment with aqueous base at 95° C., as described above, resulted in a product in which no voids were visible in optical microscopic examinations.

EXAMPLE 5

In this example the sheath polymer composition, was styrene 25, methyl methacrylate 65 and butyl acrylate 10. The sheath polymer had a Tg of 89° C. Voids were visible under optical microscopic examination after treatment with aqueous sodium hydroxide at 97.5° C.

EXAMPLE 6

In this procedure the core polymer was made without a seed polymerization step. The core particles were 350 nanometers in diameter and their composition was methyl methacrylate 30.5 parts, methacrylic acid 39.9 parts, butyl acrylate 29.1 parts and ethylene glycol dimethacrylate 0.5 parts. Core polymerization did not differ significantly from that described in Example 1.

The sheath polymer composition comprises 20 parts styrene, 60 parts methyl methacrylate and 20 parts butyl acrylate with 1 part of ethylene glycol dimethacrylate. The sheath polymer polymerization proceeded as follows:

| | |
|---|---|
| water | 214.0 g |
| ammonium persulphate | 0.3 g |
| core polymer | 110 g |
| monomer emulsion: | |
| water | 83.3 g |
| anionic surfactant (Siponate DS-10) | 0.7 g |
| nonionic surfactant (Alkasurf NP-40) | 1.7 g |
| styrene | 44.0 g |
| methyl methacrylate | 132.0 g |
| butyl acrylate | 44 g |
| ethylene glycol dimethacrylate | 2.2 g |
| initiator solution: | |
| water | 14.0 g |
| ammonium persulphate | 0.3 g |
| reducer solution: | |
| water | 14.0 g |
| sodium formaldehyde sulfoxylate | 0.2 g |

In a 1-liter reactor, water, initiator and core latex were stirred at 85° C. under a blanket of nitrogen. The monomer pre-emulsion was added at the rate of 1.6 gm/min. Separate initiator and reducer solutions were added at the rate of 0.06 ml/min. After monomer addition was complete, the emulsion was held for one hour at 85° C., then cooled to 25° C. and filtered through a 200 mesh screen. The final latex had particle size equal to 645 nanometers. Tg of the sheath was estimated to be 52° C., using the equation and homopolymer Tg values mentioned above. Solid content of the polymer was 38.8%.

Treatment with 10% aqueous sodium hydroxide at 90° C. for 1 hour produced void-containing particles with 698 nanometer diameter. This corresponds to 8.2% overall diameter swelling and 167% core volume swelling.

EXAMPLE 7

In this case also, the core polymer was made without a seed polymerization step. The core composition, in parts by weight, was methyl methacrylate 30.65, methacrylic acid 40.07 and butyl acrylate 29.26. The core particle diameter was 350 nanometers and the solids content of this emulsion was 29.9%.

The proportions of the various ingredients used in the polymerization of the shell copolymer were as follows:

| | |
|---|---|
| styrene | 16.5 g |
| butyl acrylate | 16.4 g |
| methyl methacrylate | 69.38 g |
| ethylene glycol dimethacrylate | 1.105 g |
| water | 42 g |

| | |
|---|---|
| ammonium persulphate | 0.15 g |
| sodium formaldehyde sulfoxylate | 0.10 g |
| core polymer (plus 105 g water) | 55 g |

The monomer ratios in the shell were: styrene 15, butyl acrylate 15, methyl methacrylate 70 and ethylene glycol dimethacrylate 1.0. The solids content of the final emulsion was 35.8%, with a particle size of 510 nanometers. The Tg of the sheath polymer was estimated to be 64° C. Treatment with hot aqueous potassium hydroxide produced void-containing particles with 600 nanometer diameter. This is equal to 18% diameter swelling and 194% core volume swelling.

We claim:

1. A core/sheath polymer particle comprising a core of a polymer formed from at least one ethylenically unsaturated monomer containing acid functionality and a hard sheath substantially encapsulating said core, said sheath consisting essentially of a copolymer of a non-ionic monoethylenically unsaturated aliphatic monomer, at least two weight percent of an ester-containing unsaturated monomer selected such that the homopolymer of said ester-containing unsaturated monomer has a glass transition temperature not higher than 15° C. and from 0.25 mole percent of a non-ionically monoethylenically unsaturated aromatic monomer and the glass transition temperature of the copolymer forming said sheath being at least 40° C. and being free of functional acid groups and said particles containing at least one void resulting from a reaction with a non-volatile fixed or permanent base.

2. A core/sheath polymer particle according to claim 1 in which the nonionic monoethylenically unsaturated aromatic monomer is selected from the class consisting of styrene, alphamethyl styrene, vinyl toluene, ring substituted derivatives of alphamethyl styrene and of vinyl toluene and mixtures thereof.

3. A core/sheath polymer particle according to claim 1 in which the said glass transition temperature of the copolymer forming said sheath is up to 120° C.

4. A core/sheath polymer particle according to claim 1 in which the glass transition temperature of the copolymer forming said sheath is from 60° C. to 100° C.

5. A core/sheath polymer particle according to claim 1 in which said nonionic monoethylenically unsaturated aliphatic monomer forming said copolymer of said sheath is selected from the class consisting of esters of methacrylic acid, vinyl chloride, vinylidene chloride and acrylonitrile.

6. A core/sheath polymer particle according to claim 1 in which said ester-containing unsaturated monomer is selected from the class consisting of alkyl acrylates, alkyl methacrylates, long chain esters of acrylic acid, long chain esters of methacrylic acid and esters of maleic acid.

7. A core/sheath polymer particle according to claim 1 in which said ester-containing unsaturated monomer is selected from the class consisting of butyl acrylate, ethyl acrylate, isobutyl acrylate, ethyl hexyl acrylate and dibutyl maleate.

8. A core/sheath polymer particle according to claim 1 in which said ethylenically unsaturated monomer containing acid functionality is selected from the class consisting of acrylic acid, methacrylic acid, itaconic acid, aconitic acid, maleic acid, maleic anhydride, fumaric acid, crotonic acid, and monoesters of these acids.

9. A core/sheath polymer particle according to claim 1 in which said core is a copolymer of said ethylenically unsaturated monomer containing acid functionality and an ethylenically unsaturated monomer containing no ionisable group.

10. A core/sheath polymer according to claim 1 in which said core is a copolymer of an ethylenically unsaturated monomer containing no ionisable group which is selected from the class consisting of methyl methacrylate, styrene, vinyl toluene, alphamethyl styrene, ethylene, vinyl acetate, vinyl chloride, arylonitrile, methacrylamide, acrylamide, alkyl esters of methacrylic acid, alkenyl esters of methacrylic acid, alkyl esters of acrylic acid, alkenyl esters of acrylic acid and alkyl esters of vinyl alcohol.

11. A core/sheath polymer particle according to claim 1 in which the core polymer is formed from at least 10 percent by weight of said ethylenically unsaturated monomer containing acid functionality.

12. A core/sheath polymer particle according to claim 1 in which the amount of said ethylenically unsaturated monomer containing acid functionality forms at least 20% by weight of said core polymer.

13. A core/sheath polymer particle according to claim 1 in which the core polymer also is prepared from ethylenically unsaturated monomer having at least difunctionality.

14. A core/sheath polymer particle according to claim 1 in which said core is a copolymer of a monomer is selected from the class consisting of ethylene glycol dimethacrylate, ethylene glycol diacrylate, allyl methacrylate, allyl acrylate, 1,3-butane diol dimeth-acrylate, 1,3-butane diol diacrylate, divinyl benzene and trimethylolpropane triacrylate in an amount of from 0.1% to 5% by weight of the total monomer formed into the core.

* * * * *

UNITED STATES PATENT AND TRADEMARK OFFICE
CERTIFICATE OF CORRECTION

PATENT NO. : 4,985,469

DATED : January 15, 1991

INVENTOR(S) : Gerald K. Chip et al.

It is certified that error appears in the above-identified patent and that said Letters Patent is hereby corrected as shown below:

On the title page under [73] Assignee:

"Tioxide Group" should read as -- Tioxide Group, PLC --

Claim 1, line 16, (Col. 9, line 32) "a" should read -- the --.

Signed and Sealed this

Twenty-eighth Day of July, 1992

Attest:

DOUGLAS B. COMER

Attesting Officer

Acting Commissioner of Patents and Trademarks